United States Patent
Tsuji et al.

(10) Patent No.: US 12,372,483 B2
(45) Date of Patent: Jul. 29, 2025

(54) SYSTEM FOR NON-DESTRUCTIVELY INSPECTING BAGGAGE, METHOD FOR NONDESTRUCTIVELY INSPECTING BAGGAGE, PROGRAM, AND RECORDING MEDIUM

(71) Applicants: EYETECH CO., LTD., Tokyo (JP); NIPPON SIGNAL CO., LTD., Tokyo (JP)

(72) Inventors: Yosuke Tsuji, Tokyo (JP); Shinya Saito, Tokyo (JP); Tatsuro Hayashi, Tokyo (JP); Eishi Kawasaki, Saitama (JP); Masaki Takahashi, Saitama (JP); Kazuaki Takayama, Saitama (JP)

(73) Assignees: Eyetech Co., Ltd., Tokyo (JP); Nippon Signal Co., Ltd., Tokyo (JP)

( * ) Notice: Subject to any disclaimer, the term of this patent is extended or adjusted under 35 U.S.C. 154(b) by 435 days.

(21) Appl. No.: 17/773,252

(22) PCT Filed: Sep. 30, 2020

(86) PCT No.: PCT/JP2020/037220
§ 371 (c)(1),
(2) Date: Apr. 29, 2022

(87) PCT Pub. No.: WO2021/085019
PCT Pub. Date: May 6, 2021

(65) Prior Publication Data
US 2022/0381706 A1 Dec. 1, 2022

(30) Foreign Application Priority Data
Oct. 31, 2019 (JP) .................................. 2019-199305

(51) Int. Cl.
*G01N 23/10* (2018.01)
*G01N 23/04* (2018.01)
*G01N 23/083* (2018.01)

(52) U.S. Cl.
CPC ............. *G01N 23/10* (2013.01); *G01N 23/04* (2013.01); *G01N 23/083* (2013.01)

(58) Field of Classification Search
CPC .... G01N 23/10; G01N 23/083; G01N 23/087; G01N 23/04; G06T 7/00;
(Continued)

(56) References Cited

U.S. PATENT DOCUMENTS 5,367,552 A * 11/1994 Peschmann ........... G06T 7/0004
378/57
8,515,010 B1 * 8/2013 Hurd .................... G01N 23/083
378/57
(Continued)

FOREIGN PATENT DOCUMENTS

JP 10185841 A 7/1998
JP 10185841 A1 12/2000
(Continued)

OTHER PUBLICATIONS

Notification of Reasons for Refusal issued to Japanese Patent Application No. 2021-554216 dated Apr. 18, 2023.
(Continued)

*Primary Examiner* — David P Porta
*Assistant Examiner* — Soorena Kefayati
(74) *Attorney, Agent, or Firm* — Manatt, Phelps & Phillip

(57) ABSTRACT

Provided are system, method, program, and recording medium for non-destructively inspecting baggage in which an inspection corresponding to an article to be inspected is performed even when the article overlaps various objects including similar materials, whereby the system, method,
(Continued)

program, and recording medium are efficient and do not exhibit any oversight in inspection. The system comprising a belt conveyor by which baggage is transported, a radiation unit that irradiates the baggage with X-rays, an imaging unit that captures X-rays passing through the baggage, an analysis unit by which image information from the imaging unit is analyzed, a display unit by which an image analyzed by the analysis unit is displayed, and a controller that performs a control so that at least part of the article to be sensed is displayed as an object by the display unit when at least part of the article is analyzed.

8 Claims, 6 Drawing Sheets

(58) Field of Classification Search
CPC .. G06T 2207/30112; G01V 5/22; G01V 5/20; G01V 5/224
See application file for complete search history.

(56) References Cited

U.S. PATENT DOCUMENTS

| | | | | |
|---|---|---|---|---|
| 11,335,083 | B2* | 5/2022 | Sankai | G06V 10/454 |
| 2008/0240578 | A1* | 10/2008 | Gudmundson | G06V 10/255 |
| | | | | 340/568.1 |
| 2009/0252295 | A1* | 10/2009 | Foland | G01V 5/226 |
| | | | | 378/98.12 |
| 2010/0246937 | A1* | 9/2010 | Basu | G06T 15/08 |
| | | | | 382/154 |
| 2012/0093367 | A1* | 4/2012 | Gudmundson | G01V 5/20 |
| | | | | 382/103 |
| 2012/0099777 | A1* | 4/2012 | Ying | G06T 15/20 |
| | | | | 382/131 |
| 2014/0010437 | A1* | 1/2014 | Naidu | G06V 20/52 |
| | | | | 382/154 |
| 2014/0376686 | A1* | 12/2014 | Dreiseitel | G01V 5/226 |
| | | | | 382/304 |
| 2015/0030125 | A1* | 1/2015 | Pfander | G01V 5/22 |
| | | | | 378/57 |
| 2015/0185357 | A1* | 7/2015 | Chen | G01T 1/2985 |
| | | | | 378/5 |
| 2015/0332448 | A1* | 11/2015 | Zhang | G01V 5/226 |
| | | | | 382/103 |
| 2017/0184756 | A1* | 6/2017 | Miao | G01V 5/224 |
| 2018/0195977 | A1* | 7/2018 | Wang | G06F 18/214 |
| 2018/0336672 | A1* | 11/2018 | Perticone | G06T 7/73 |

FOREIGN PATENT DOCUMENTS

| | | |
|---|---|---|
| JP | 2018-113038 | 7/2018 |
| JP | 2018-113038 A | 7/2018 |
| JP | 6568634 | 8/2019 |
| JP | 6568634 B | 8/2019 |
| TW | 200506409 A | 2/2005 |
| WO | 201915090 A1 | 8/2019 |
| WO | 2019150920 | 8/2019 |

OTHER PUBLICATIONS

Office Action issued by the Intellectual Property Office of the Ministry of Economic Affairs of Taiwan in corresponding Taiwan application No. 109136310 dated Oct. 2, 2023.

* cited by examiner

SYSTEM FOR NON-DESTRUCTIVELY INSPECTING BAGGAGE, METHOD FOR NONDESTRUCTIVELY INSPECTING BAGGAGE, PROGRAM, AND RECORDING MEDIUM

CROSS REFERENCE TO RELATED APPLICATIONS

This application claims priority to and is a national stage application under 35 U.S.C. 371 of PCT Application No. PCT/JP2020/037220, filed on Sep. 30, 2020, which claims priority to JP Application No. 2019-199305, filed on Oct. 31, 2019. All of the above applications are incorporated herein by reference.

FIELD

The present invention relates to a system for non-destructively inspecting baggage, a method for non-destructively inspecting baggage, a program, and a recording medium.

BACKGROUND

Baggage inspections are carried out at, for example, airports, ports, and event sites. Baggage inspections are usually carried out by using X-ray detectors (see, for example, PTL 1).

With the invention described in PTL 1, the conveyance speed of a baggage conveyance device is made variable, and a distortion in a perspective image of a piece of baggage caused by a change in the conveyance speed can be corrected by a control device.

PTL 1: Japanese Unexamined Patent Application Publication No. 10-185841

SUMMARY

Technical Problem

With the prior art, inspections have taken time, devices have been large in size, and costs have been high. Accordingly, there has been a demand for shortening inspection time, reducing the sizes of devices, and decreasing costs. Listed below are problems of typical X-ray baggage inspection systems to be solved.

(1) When detection targets overlap, there is the possibility of an oversight.

(2) To solve (1), a method is available in which large-sized electronic devices, such as PCs, are taken out in advance and inspected as at, for example, airports; however, inspections take long.

(3) To solve (1), dual energy X-ray inspection devices and baggage inspection devices using CT are available; however, costs are high and the devices are large in size.

(4) Even with dual energy X-ray baggage inspection devices, it may be difficult to distinguish a detection target from an item made of a material similar to that of the detection target when the detection target and the item overlap.

(5) With systems in which inspectors are to visually inspect all X-ray images, inspections take long, personal costs are high, and inspection rigorousness depends on the inspector.

Accordingly, an object of the present invention is to provide a system for non-destructively inspecting baggage, a method for non-destructively inspecting baggage, a program, and a recording medium that make inspections efficient without an oversight even when a detection target and various items including those made of a material similar to that of the detection target partially overlap, by carrying out an inspection corresponding to the possessor of the inspection target.

Solution to Problem

To solve the above-described problems, according to a first aspect of the present invention, there is provided a system for non-destructively inspecting baggage including: conveyance means for conveying a piece of baggage; irradiation means for irradiating the piece of baggage with an X-ray; imaging means for imaging the X-ray that passes through the piece of baggage; analysis means for analyzing image information from the imaging means; and display means for displaying an image analyzed by the analysis means, the system further including control means for performing control, when a subject and another subject overlap in the piece of baggage, the subject is a detection target to be detected in an X-ray inspection, and at least a portion of the detection target is analyzed, to display at least the portion of the detection target on the display means as an object.

Examples of the subjects include knives. Knives are basically those defined in Article 22 of the Firearm and Sword Control Law and prohibited from being carried. Knives are those having a blade of 60 mm or more in length and 20 mm or more in width and imaged. Note that knives having a blade that is made of a material other than metal or ceramic, having a blade that is easily deformed and has a less-lethal thickness, having a blade covered by metal (for example, clasp knives and cutter knives). Examples include army knives, bayonets, cutter knives, knives for electrical work, mountaineering knives, butcher knives, sickle-shaped knives, petit knives, bread knives, salmon knives, knives for frozen food, boning knives, knives for removing sinews, Western-style knives, Chinese chefs knives, kitchen knives for vegetables, thin-bladed kitchen knives, broad-bladed kitchen knives, kitchen knives for sashimi, hatchets, axes, saws, small swords, swords, sabers, combat knives, daggers, hatchets, small swords, saws, and axes.

According to a second aspect of the present invention, in the first aspect, the detection target is at least any of a knife, a firearm, or an explosive substance or device.

The explosive substance or device is a substance or a device having, for example, a density of 1.2 g/cm$^3$ or more and a mass of 2 kg or more and imaged as a single body. Examples of the explosive substance or device include explosive devices obtained by using a highly airtight container such as a water pipe or a pressure cooker, dynamite mainly consisting of nitroglycerine, dynamite mainly consisting of ammonium nitrate, military explosives such as C-4, TNT, and picric acid, homemade explosives made of, for example, ammonium nitrate and fuel oil, gunpowder such as black powder and smokeless powder, ANFO (Ammonium Nitrate Fuel Oil Explosive), industrial explosives such as slurry explosives, and explosive devices such as fuses and blasting caps. The firearm includes a pistol, a rifle, and an automatic rifle. Examples of the pistol include a gun barrel, a grip, a trigger, a hammer, a bullet holder, and a bullet and also include a pistol assembled into a single body and a pistol disassembled so as to be reassembled. Examples of the rifle include a gun barrel, a trigger, a lever, a hammer, a gunstock, and a bayonet and also include a rifle assembled into a single body and a rifle disassembled so as to be reassembled. Examples of the automatic rifle include a gun barrel, a trigger, a chamber, a cartridge, a gunstock, and a bayonet and also include an automatic rifle assembled into a single body and an automatic rifle disassembled so as to be reassembled. The rifle is assumed to be a single-shot gun, and the automatic rifle is assumed to be a semi-automatic or fully automatic repeater.

According to a third aspect of the present invention, in the first aspect, the detection target is identified on the basis of a plurality of characteristic aspects.

In a case where the detection target is a knife, a first characteristic aspect is its point (knife-point), a second characteristic aspect is its blade (knife-blade), and a third characteristic aspect is its heel (knife-heel). In a case where the detection target is an explosive substance or device, the first characteristic aspect is the permeability of its container, the second characteristic aspect is its effective atomic weight, and the third characteristic aspect is its form. In a case where the detection target is a pistol that is a type of firearm, the first characteristic aspect is its gun barrel, the second characteristic aspect is its trigger, and the third characteristic aspect is its hammer. In a case where the detection target is a rifle that is a type of firearm, the first characteristic aspect is its gun barrel, the second characteristic aspect is its trigger, and the third characteristic aspect is its gunstock. In a case where the detection target is an automatic rifle, the first characteristic aspect is its gun barrel, the second characteristic aspect is its trigger, and the third characteristic aspect is its cartridge.

According to a fourth aspect of the present invention, in the first aspect, instead of the X-ray, CT, dual energy, dual energy CT, or photon counting is used.

CT stands for Computed Tomography and refers to computer tomographic imaging. Dual energy refers to X-ray imaging in which a substance-specific attenuation coefficient difference is calculated from data obtained by X-ray irradiation at different voltages and a target substance is identified or extracted and quantified. Dual energy CT is an advanced type of dual energy and refers to computer tomographic imaging in which a substance-specific attenuation coefficient difference is calculated from data obtained by X-ray irradiation at different voltages and a target substance is identified or extracted and quantified. Dual energy CT enables, for example, virtual monochromatic X-ray images (Mono images) or material decomposition images (MD images), measurement of densities of various substances including iodine and fat, and effective atomic number analysis and is expected to be a new imaging method that lifts restrictions on single energy CT and exceeds the roles of the existing CT. It is known that when dual energy CT is used, for example, the amount of contrast medium is reduced mainly because of an increased constant obtained by using iodine density information, and lesion detectability is improved. It is also suggested that dual energy CT has the possibility of decreasing the number of phases of multiphase imaging of the abdominal region.

Photon counting is a highly sensitive measurement method in which photons are counted one by one to measure an X-ray. Photon counting has the advantages of improving the S/N in a low input signal region and facilitating miniaturization of elements of detectors from a configuration viewpoint. Currently, photon counting is applied to, for example, bone density measuring instruments and cosmic-ray measuring instruments. Photon counting detectors are constituted by a semiconductor and electrodes. In response to an incoming photon, electron-hole pairs are generated within the semiconductor. The electrons and the holes are read by applying a voltage between the electrodes to thereby obtain a charge pulse signal output. A large number of electron-hole pairs are generated in response to a high-energy photon, and a small number of electron-hole pairs are generated in response to a low-energy photon, and therefore, a charge pulse having an intensity corresponding to the energy of the incoming photon is generated on a read circuit. The heights of pulses are discriminated by a discriminator to separate the pulses into pulses corresponding to a photon energy higher than or equal to a threshold and pulses corresponding to a photon energy lower than or equal to the threshold, and the pulses are counted by a counter.

According to a fifth aspect of the present invention, in the first aspect, the control means includes a similarity estimation unit that inputs the image information to a learning model and obtains a score indicating a degree of similarity from the learning model, and the control means performs control to display at least one of a knife-point, a knife-blade, or a knife-heel of the knife when the obtained score satisfies a predetermined condition, the learning model being a trained model subjected to machine learning for estimating a degree of similarity of an image of the knife in the piece of baggage with a knife-point, a knife-blade, or a knife-heel.

According to a sixth aspect of the present invention, in the fifth aspect, the similarity estimation unit includes division means for dividing the image into a plurality of borders, areas, or grid cells, position calculation means for calculating a position of each of the grid cells, and reliability level calculation means for calculating a reliability level of each of the grid cells.

According to a seventh aspect of the present invention, in the first aspect, the control means performs for the object, at least one of changing of an aspect ratio, changing of an angle of rotation, enlarging, reducing, horizontal flipping, or color changing.

According to an eighth aspect, there is provided a method for non-destructively inspecting baggage including: a first step of conveying a piece of baggage; a second step of irradiating the piece of baggage with an X-ray; a third step of imaging the X-ray that passes through the piece of baggage; a fourth step of analyzing image information from the third step; and a fifth step of displaying an image analyzed in the fourth step, the method further including a sixth step of performing control, when a subject and another subject overlap in the piece of baggage, the subject is a knife, and at least one of a knife-point, a knife-blade, or a knife-heel of the knife is analyzed in the fourth step, to display the at least one of the knife-point, the knife-blade, or the knife-heel of the knife as an object in the fifth step.

According to a ninth aspect, there is provided a method for non-destructively inspecting baggage for detecting a detection target from an X-ray image obtained by irradiating a piece of baggage with an X-ray, in which the detection target is a knife, a firearm, or an explosive substance or device, a detected portion is displayed so as to be identifiable, a threshold that indicates a detection performance is allowed to be changed for each of the outputs in accordance with a situation, and a notification of an unsatisfactory imaging condition is given when a specific proportion or more of the image is black.

In the ninth aspect, changing a threshold that indicates a detection performance in accordance with a situation refers to increasing the threshold when, for example, a foreign VIP visits Japan or returns to their country to increase the detection capability, or decreasing the threshold when, for example, students on a school excursion visit or leave a site to decrease the detection capability to thereby increase efficiency. When a specific proportion or more of the image is black, a notification of an unsatisfactory imaging condition is given. Then, conveyance of baggage is suspended, and an inspector opens the piece of baggage and checks the inside by themselves, and therefore, it can be determined whether the black portion corresponds to a dangerous item.

According to a tenth aspect of the present invention, each of the outputs is a threshold of a reliability level that indicates the detection performance, and the threshold is allowed to be changed.

For each of the outputs, when a threshold of a reliability level indicating the detection performance is changed, throughput during a busy period can be improved or the inspection level can be increased or decreased in accordance with the characteristics of the visitor or the degree of congestion. For example, the threshold is increased when a foreign VIP visits a site or decreased when students on a school excursion visit a site to thereby make inspections efficient.

According to an eleventh aspect of the present invention, there is provided a computer-readable program for a system for non-destructively inspecting baggage in which a piece of baggage conveyed by conveyance means is irradiated with an X-ray, the X-ray that passes through the piece of baggage is imaged by imaging means, image information from the imaging means is analyzed by analysis means, and an image analyzed by the analysis means is displayed on display means, the computer-readable program causing a computer to execute: a first function of analyzing at least a portion of a detection target that is a subject to be detected in an X-ray inspection and that overlaps with another subject in the piece of baggage; and a second function of performing control to display at least the portion of the detection target on the display means as an object.

According to a twelfth aspect of the present invention, there is provided a recording medium recording the program.

Advantageous Effects of Invention

According to the present invention, a system for non-destructively inspecting baggage, a method for non-destructively inspecting baggage, a program, and a recording medium that make inspections efficient without an oversight even when detection targets overlap, by carrying out an inspection corresponding to the possessor of the inspection targets can be provided.

DETAILED DESCRIPTION OF EMBODIMENTS

The system for non-destructively inspecting baggage according to the present invention will be described with reference to the drawings.

Figure 1:
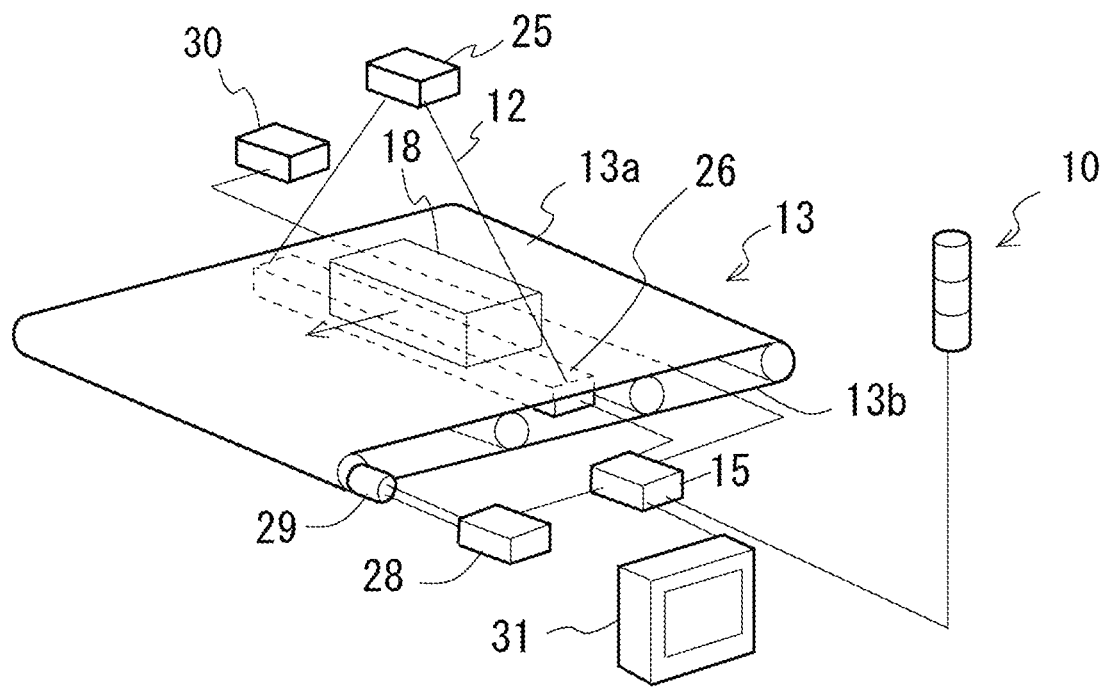
FIG. 1 is an example conceptual diagram of a system for non-destructively inspecting baggage according to the present invention.

FIG. 1 is an example conceptual diagram of the system for non-destructively inspecting baggage according to the present invention.

In FIG. 1, an X-ray source 25 that radiates an X-ray beam 12 toward a belt conveyor 13 is disposed over the belt conveyor 13, and an X-ray detector 26 is disposed between a carrier-side belt 13a and a return-side belt 13b of the belt conveyor 13.

Although FIG. 1 illustrates a case where the X-ray source 25 is disposed over the belt conveyor 13 and the X-ray detector 26 is disposed between the carrier-side belt 13a and the return-side belt 13b of the belt conveyor 13, the present invention is not limited to this. The X-ray detector 26 may be disposed over the belt conveyor 13 and the X-ray source 25 may be disposed between the carrier-side belt 13a and the return-side belt 13b of the belt conveyor 13 or under the belt conveyor 13.

The X-ray beam 12 from the X-ray source 25 is detected by the X-ray detector 26. A piece of baggage 18 on the belt conveyor 13 is irradiated with the X-ray beam 12 and a subject in the piece of baggage 18 is imaged by X-ray imaging. An output of the X-ray detector 26 is input to a controller 15, and an output of the controller 15 is input to a monitor 31. A drive circuit 28 for driving and rotating a motor 29 of the belt conveyor 13 is controlled by the controller 15. Near the belt conveyor 13, a sensor 30 that detects the presence or absence of the piece of baggage 18 is disposed. For the subject in the piece of baggage 18, an object detector, such as YOLO (registered trademark) or SSD (Single Shot MultiBox Detector), performs division into grid cells, calculation of the position of each of the grid cells, and calculation of the reliability level. The monitor 31 displays an inspection result as an object when the reliability level exceeds a threshold. Note that the object may be surrounded by a rectangular frame, the outline of the object may be displayed, or text (for example, "knife detected" or "explosive substance or device detected") may be displayed.

That is, even when a dangerous item (for example, a knife) that is a subject and another subject different from the dangerous item overlap, the dangerous item is displayed.

YOLO (registered trademark) is the acronym of You Only Look Once and is a neural network that enables high-speed processing by simultaneously performing detection of the position of an item and classification.

That is, in YOLO (registered trademark), an entire image is divided in advance into grid cells, and an object is identified and the position (box) is calculated for each cell to thereby attain a significant reduction in computational time.

Figure 2:
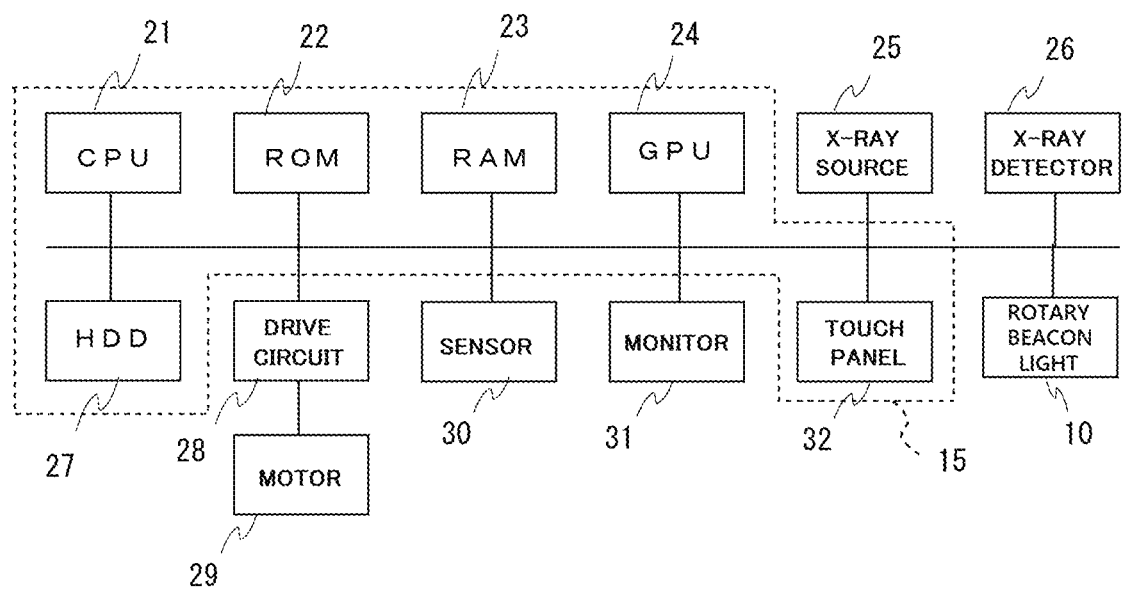
FIG. 2 is an example hardware block diagram of the system for non-destructively inspecting baggage illustrated in FIG. 1.

FIG. 2 is an example hardware block diagram of the system for non-destructively inspecting baggage illustrated in FIG. 1.

The system for non-destructively inspecting baggage illustrated in FIG. 2 includes a CPU (Central Processing Unit) 21, a ROM (Read-Only Memory) 22, a RAM (Random Access Memory) 23, a GPU (Graphics Processing Unit) 24, the X-ray source 25, the X-ray detector 26, an HDD (Hard Disc Drive) 27, the drive circuit 28, the motor 29, the sensor 30, the monitor 31, and a touch panel 32. A rotary beacon light 10 is configured to make a lamp flash or rotate or to produce a warning beep in response to, for example, detection of a dangerous item or the occurrence of a failure or abnormality in the system.

The CPU 21, the ROM 22, the RAM 23, the GPU 24, the HDD 27, and the touch panel 32 constitute the controller.

The CPU 21 is an element that includes a program counter in which an address indicating a position in the ROM 22 from which an instruction is read is saved, an instruction decoding circuit that interprets the instruction read from the ROM 22, an arithmetic circuit that performs arithmetical operations and logical operations, and an internal register that saves temporary information.

The ROM 22 is an element that stores a control program and is, for example, a mask ROM.

The RAM 23 is an element to which the control program saved in the ROM 22 is loaded, and is, for example, a flash memory.

Although the GPU 24 is originally an image processing device, it has been found that its high computational capability of graphic drawing is applicable to not only weather and earthquake simulations but also machine learning and neural networks that form the basis of artificial intelligence and has been used in artificial intelligence recently. Instead of the GPU 24, a VPU (Vision Processing Unit) or an FPGA (Field-Programmable Gate Array) may be used.

The X-ray source 25 includes, for example, an anode called a fixed anode X-ray tube made of copper in which a tungsten target is embedded and a cathode in which a tungsten filament is placed, and is entirely accommodated in a vacuum glass tube. When a high voltage is applied to the anode and the cathode while the cathode filament is heated by supplying a current, negative thermions released from the filament collide with the anode at a high speed, and an X-ray is generated from the location of collision.

The X-ray detector 101 is a photodetector that measures for example, the intensity, flux, spatial distribution, and energy spectrum of an X-ray.

Although the HDD 27 is a device that mainly stores image data, the HDD 27 may be partitioned into a ROM area and a RAM area. Instead of the HDD 27, an SSD (Solid State Drive) may be used.

The drive circuit 28 is a circuit for driving the motor 29, and the motor 29 makes the belt conveyor 13 (see FIG. 1) run.

The sensor 30 determines whether the piece of baggage 18 (see FIG. 1) is present on the belt conveyor 13, and is, for example, an infrared sensor.

The monitor 31 displays an X-ray image obtained by a non-destructive inspection of a piece of baggage and a partial image of a dangerous item (for example, a knife) that is an object obtained by, for example, YOLO (registered trademark), and is, for example, a liquid crystal display device.

The touch panel 32 is a device used to operate the system for non-destructively inspecting baggage.

Figure 3:
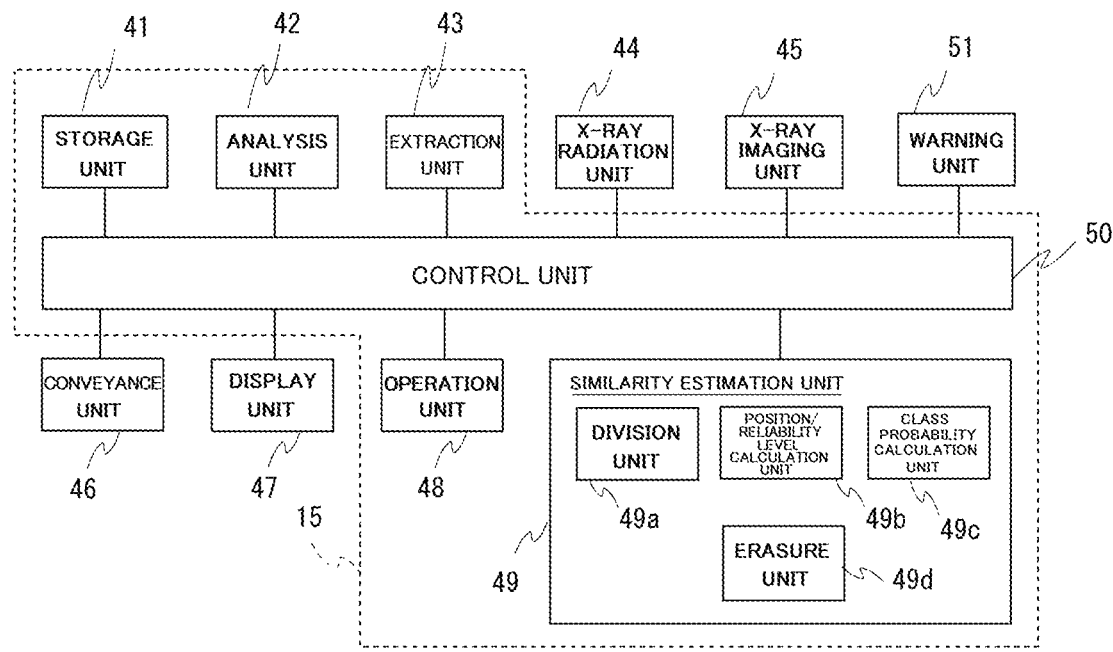
FIG. 3 is an example functional block diagram of the system for non-destructively inspecting baggage illustrated in FIG. 1.

FIG. 3 is an example functional block diagram of the system for non-destructively inspecting baggage illustrated in FIG. 1.

The system for non-destructively inspecting baggage illustrated in FIG. 3 includes a storage unit 41, an analysis unit 42, an extraction unit 43, an X-ray radiation unit 44 that is irradiation means, an X-ray imaging unit 45 that is imaging means, a control unit 50 that is control means, a conveyance unit 46 that is conveyance means, a display unit 47 that is display means, an operation unit 48, and an similarity estimation unit 49. The similarity estimation unit 49 includes a division unit 49a, a position calculation unit 49b, a reliability level calculation unit 49c, an erasure unit 49d, and a warning unit 51.

The storage unit 41, the analysis unit 42, the extraction unit 43, the control unit 50, the operation unit 48, and the similarity estimation unit 49 constitute the controller 15.

The storage unit 41 stores the control program and image data and is implemented as, for example, the ROM 22, the RAM 23, and the HDD 27 illustrated in FIG. 2.

The analysis unit 42 divides an image obtained by X-ray imaging into grid cells, calculates the position of each grid cell, and calculates the reliability level. The analysis unit 42 is implemented as, for example, the CPU 21, the ROM 22, the RAM 23, and the HDD 27 illustrated in FIG. 2.

The extraction unit 43 extracts an object from the result of analysis of an image obtained by X-ray imaging and is implemented as, for example, the CPU 21, the ROM 22, the RAM 23, and the HDD 27 illustrated in FIG. 2.

The X-ray radiation unit 44 radiates an X-ray and is, for example, the X-ray source 25 illustrated in FIG. 2.

The X-ray imaging unit 45 detects an X-ray that passes through the piece of baggage 18, a dangerous item that is a subject in the piece of baggage 18, and another subject that overlaps with the dangerous item in the piece of baggage 18, and is, for example, the X-ray detector 26 illustrated in FIG. 2.

The conveyance unit 46 helps the X-ray beam 12 (see FIG. 1) passes through the piece of baggage 18, and is implemented as, for example, the drive circuit 28 and the motor 29 illustrated in FIG. 2 and the carrier-side belt 13a, the return-side belt 13b, and rollers illustrated in FIG. 1.

The display unit 47 is a device that displays subjects in the piece of baggage 18 irradiated with an X-ray and a dangerous item that is an extracted object, and is implemented as, for example, the monitor 31 illustrated in FIG. 2.

The operation unit 48 is used to operate the system for non-destructively inspecting baggage and is, for example, the touch panel 32 illustrated in FIG. 2.

The similarity estimation unit 49 includes the division unit 49a that divides an image into a plurality of grid cells, the position calculation unit 49b that calculates the position of each grid cell, and the reliability level calculation unit 49c that calculates the reliability level of each grid cell.

The control unit 50 is provided with the similarity estimation unit that inputs image information to a learning model and obtains a score indicating the degree of similarity from the learning model, and performs control to display at least one of the knife-point, knife-blade, or knife-heel of a knife when the obtained score satisfies a predetermined condition. The learning model is a trained model subjected to machine learning for estimating the degree of similarity of an image of a knife in a piece of baggage with a knife-point, a knife-blade, or a knife-heel. The control unit 50 is implemented as, for example, the GPU 24 and the HDD 27 illustrated in FIG. 2.

The control unit 50 performs control, when a subject and another subject in a piece of baggage overlap, the subject is a knife, and at least one of the knife-point, the knife-blade, or the knife-heel of the knife is analyzed, to display the at least one of the knife-point, the knife-blade, or the knife-heel of the knife on the display unit 47 as an object.

The control unit 50 can perform for an object, at least one of changing of the aspect ratio, changing of the angle of rotation, enlarging, reducing, horizontal flipping, or color changing.

Color changing includes hue or brightness changing.

The control unit 50 is provided with the erasure unit 49*d* that erases a portion of an object at random.

The warning unit 51 makes a lamp flash or rotate or produce a warning beep in response to, for example, detection of a dangerous item or the occurrence of a failure or abnormality in the system, and is implemented as, for example, the rotary beacon light 10 illustrated in FIG. 2.

Figure 4A:
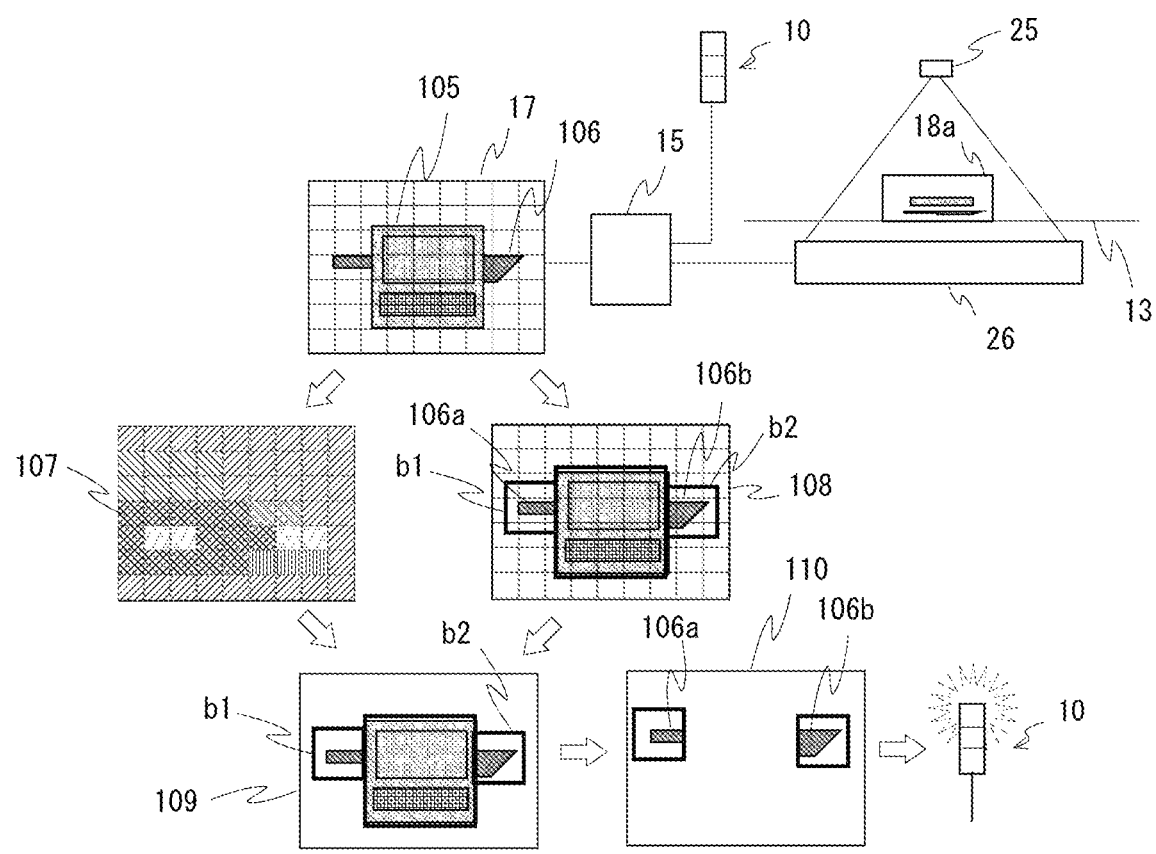
FIG. 4A is an example explanatory diagram for explaining operations of the system for non-destructive inspection illustrated in FIG. 1.
Figure 4B:
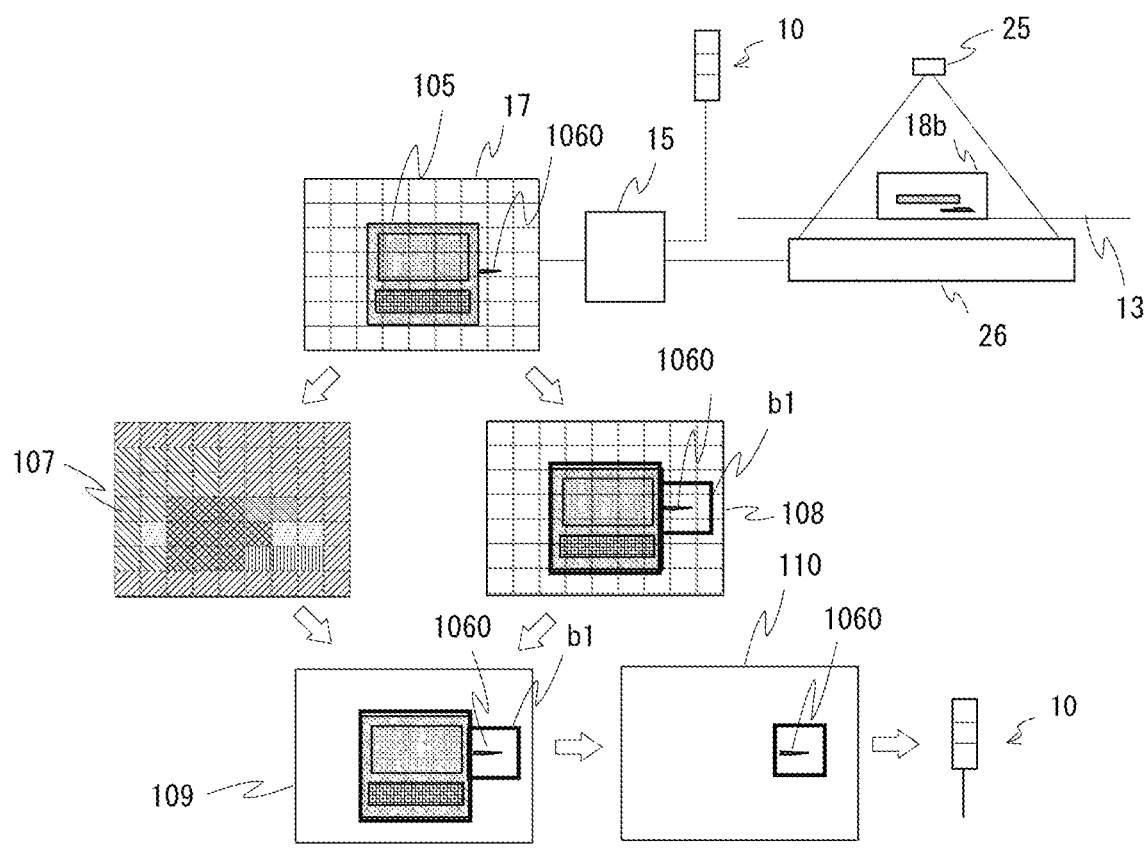
FIG. 4B is another example explanatory diagram for explaining operations of the system for non-destructive inspection illustrated in FIG. 1.
Figure 5:
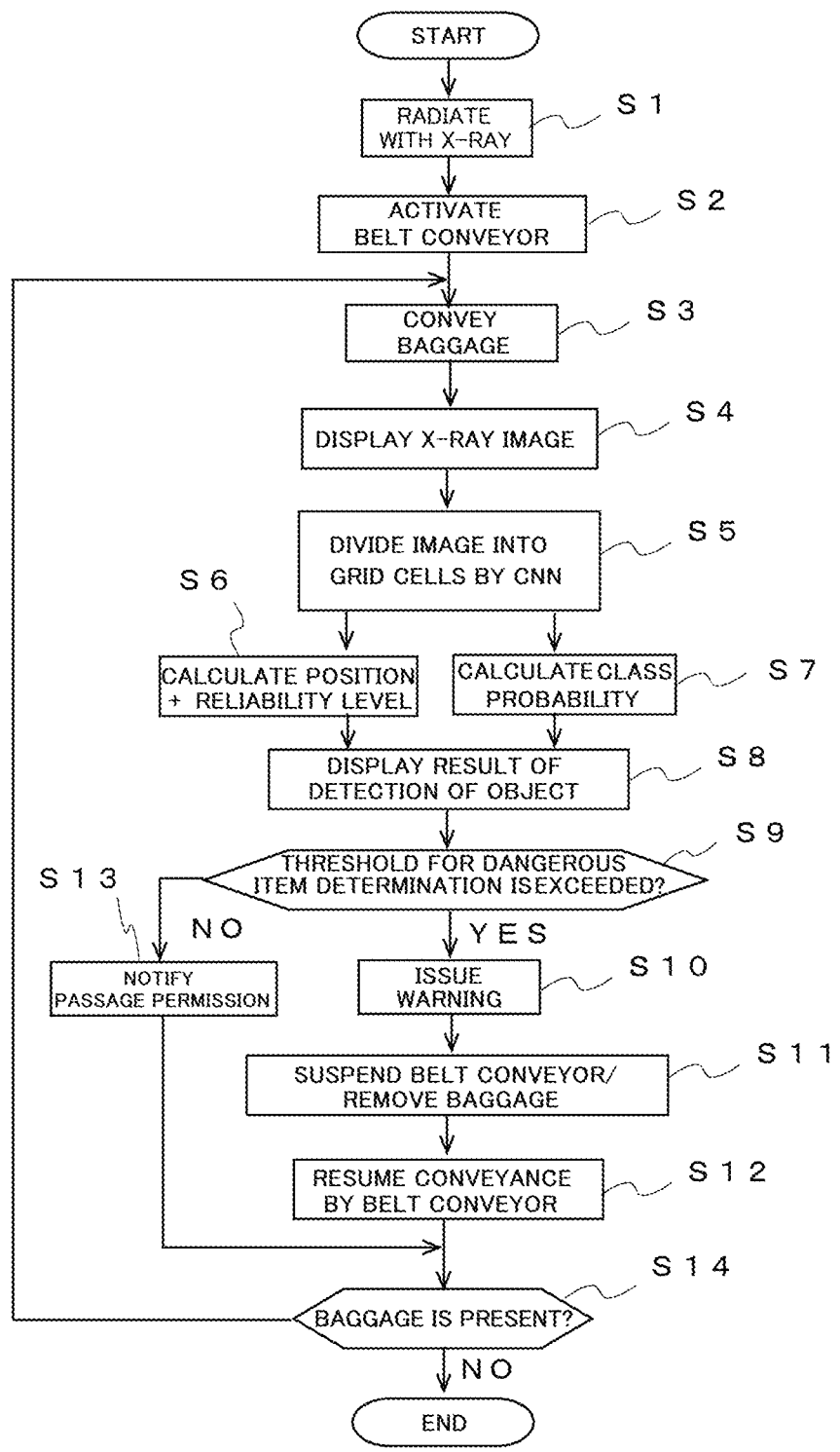
FIG. 5 is an example flowchart for explaining operations of the system for non-destructive inspection illustrated in FIG. 1.

FIG. 4A is an example explanatory diagram for explaining operations of the system for non-destructive inspection illustrated in FIG. 1. FIG. 4B is another example explanatory diagram for explaining operations of the system for non-destructive inspection illustrated in FIG. 1. FIG. 5 is an example flowchart for explaining operations of the system for non-destructive inspection illustrated in FIG. 1.

A threshold for dangerous item determination used in the non-destructive inspection illustrated in FIG. 4A is made higher than a threshold used in the non-destructive inspection illustrated in FIG. 4B. The threshold for dangerous item determination is set to a high value when, for example, a foreign VIP visits Japan or returns to their country because in case a terror act is committed, this may spark a diplomatic incident. On the other hand, when students on a school excursion leave or reenter the country, the students are less likely to possess a dangerous item. If the inspection is interrupted each time the system responds to a ballpoint pen or a mechanical pencil, this leads to congestion. Therefore, the threshold for dangerous item determination may be set to a low value.

In the non-destructive inspection illustrated in FIG. 4A, when a piece of baggage 18*a* is conveyed by the belt conveyor 13 in a specific direction (a direction vertical to the plane of the figure) so as to pass through the X-ray beam 12 radiated from the X-ray source 25, the X-ray beam 12 that passes through the piece of baggage 18*a* is detected by the X-ray detector 26. A signal from the X-ray detector 26 is input to the controller 15 and is divided into grid cells by, for example, CNN. Class probability calculation displayed on a screen image 107 and position and reliability level calculation displayed on a screen 108 (the thickness of the frame of a box indicates the magnitude of the reliability level) are simultaneously performed, and objects 106*a* and 106*b* are displayed in frames b1 and b2 respectively. On the basis of data displayed on the screen image 107 and that displayed on the screen 108, a dangerous item (for example, a knife) 106, which is a subject, and a notebook computer 105, which is another subject overlapping with the dangerous item 106, are displayed. On a screen 110, only the objects 106*a* and 106*b* are displayed. The objects 106*a* and 106*b* are apparently portions of a knife and exceed the threshold for dangerous item determination, and therefore, the rotary beacon light 10 is activated. In response to activation of the rotary beacon light 10, the belt conveyor 13 is stopped, and a buzzer may buzz, a siren may sound, or a screen may display a warning.

In the non-destructive inspection illustrated in FIG. 4B, a piece of baggage 18*b* conveyed by the belt conveyor 13 is irradiated with the X-ray beam 12 and the X-ray beam 12 is detected by the X-ray detector 26 as in FIG. 4A. A signal from the X-ray detector 26 is processed by the controller 15 and is divided into grid cells. Class probability calculation displayed on the screen image 107 and position and reliability level calculation displayed on the screen 108 (the thickness of the frame of a box indicates the magnitude of the reliability level) are simultaneously performed, and an object 1060 is displayed in the frame b1. On the basis of data displayed on the screen image 107 and that displayed on the screen 108, the ballpoint pen 1060, which is a subject, is displayed. The ballpoint pen 1060 apparently does not exceed the threshold for dangerous item determination, and therefore, the rotary beacon light 10 is not activated, and the inspection is continuously carried out for the next piece of baggage.

CNN is the acronym of Convolutional Neural Network and is a neural network into which an operation of "convolution" is introduced. Convolution is a technique often used in image processing and is a conversion process in which, for grid numerical data called a kernel (or a filter) and numerical data of a partial image (which is called a window) having a size the same as that of the kernel, the sum of the products of corresponding elements is calculated to thereby obtain a single numerical value. This conversion process is performed while the window is shifted bit by bit to thereby attain conversion to small grid numerical data (that is, a tensor).

When convolution is performed, for example, 32×32 pixels are reduced to 10×10 pixels. In this example, convolution is performed while a 5×5 kernel is shifted by 30 pixels. When the content of the kernel is changed or the size of the kernel or the pixel width of a shift is changed, a different result can be obtained.

As in the screen image 107, the reliability levels of respective grid cells are calculated, color-coded (in the figure, for example, hatched), and displayed, and as in the image 108, the positions of the respective grid cells are calculated.

As in an image 109, the frames b1 and b2 indicating objects are displayed for the dangerous item 106. Further, the dangerous item 106 in the frames b1 and b2 is displayed.

The operations illustrated in FIG. 4A and FIG. 4B will be described with reference to the flowchart illustrated in FIG. 5.

The operations are driven by the control unit 50 (see FIG. 3). When an X-ray is radiated (step S1) and the belt conveyor is activated (step S2), a piece of baggage is conveyed (step S3). An X-ray image of the inside of the piece of baggage is displayed (step S4), and the image is divided into grid cells by CNN (step S5). The position of each grid cell is calculated (step S6), and the reliability level of each grid cell is calculated (step S7).

Calculation of the reliability level will be described below. Calculation is performed according to the degree of difficulty for each of the types of dangerous items including a knife.

Condition 1: Dangerous Items Having a Low Degree of Difficulty in Detection

If the reliability level exceeds a specific value, it is then assumed that a dangerous item is detected.

Condition 2: Dangerous Items Having a High Degree of Difficulty in Detection

Determination is performed in combination with another classifier. (If the reliability level exceeds the specific value, the likelihood of being a knife is input to a trained category classifier. If a reliability level output from the classifier exceeds the specific value, it is assumed that a dangerous item is detected.)

The result of detection of an object is displayed (step S8), and it is determined whether the reliability level exceeds the threshold for dangerous item determination. The threshold can be changed in accordance with the situation. For example, in a case where a VIP, such as the President of a foreign country, visits a site, the threshold is made higher than usual to prevent the occurrence of a terror act, and in a case of a school excursion, the threshold is made lower than usual to increase the efficiency of the inspection (step S9).

If it is determined that the reliability level exceeds the threshold for dangerous item determination (YES in step S9), a warning including at least one of the rotary beacon light or a warning beep is issued (step S10), conveyance by the belt conveyor 13 is suspended, the piece of baggage that is the warning target is removed, an explanation is given and confirmation is made by the possessor of the piece of baggage, and the possessor is detained in a case where the possessor is a dangerous item possessor or is freed in a case of erroneous determination (step S11). Here, the warning may be issued as a notification by sound or display of a warning on the monitor screen in addition to the rotary beacon light making a lamp flash or rotate.

If it is determined that the reliability level does not exceed the threshold for dangerous item determination (NO in step S9), a notification of passage permission is given by a voice synthesizer or is orally given by an inspector (step S13).

The piece of baggage in question is removed, and conveyance of baggage by the belt conveyor is resumed (step S12). If a piece of baggage is present on the belt conveyor (YES in step S14), the process returns to step S3 and the non-destructive inspection is carried out. If a piece of baggage is not present on the belt conveyor (NO in step S14), the process ends.

Accordingly, in the non-destructive inspection of baggage, even in a case where a dangerous item is hidden behind another subject and only a portion of the dangerous item is displayed on an image with the prior art, the portion of the dangerous item is identified and displayed as an object to thereby prevent an oversight by an inspector.

The system for non-destructively inspecting baggage according to the present invention described above is implemented as a program that causes a computer to perform processing. Examples of the computer include general-purpose computers, such as a personal computer and a workstation; however, the present invention is not limited to this. An example case where the functions of the present invention are implemented as a program will be described below.

An example is as follows. A computer-readable program for a system for non-destructively inspecting baggage in which a piece of baggage conveyed by conveyance means is irradiated with an X-ray, the X-ray that passes through the piece of baggage is imaged by imaging means, image information from the imaging means is analyzed by analysis means, and an image analyzed by the analysis means is displayed on display means, the computer-readable program causing a computer to execute: a first function of analyzing at least a portion of a detection target that is a subject to be detected in an X-ray inspection and that overlaps with another subject in the piece of baggage; and a second function of performing control to display at least the portion of the detection target on the display means as an object.

This program may be stored in a computer-readable recording medium.

Examples of the recording medium include computer-readable recording media, such as a CD-ROM, a flexible disk (FD), and a CD-R, semiconductor memories, such as a flash memory, a RAM, a ROM, and a FeRAM, and an HDD.

CD-ROM stands for Compact Disc Read-Only Memory. A flexible disk is referred to as an FD. CD-R stands for CD-Recordable. FeRAM stands for Ferroelectric RAM and refers to a ferroelectric memory. HDD stands for Hard Disc Drive.

Although the embodiment described above is an example of a preferred embodiment of the present invention, the present invention is not limited to the embodiment, and various modifications can be made without departing from the spirit of the present invention. For example, although an example case where the belt conveyor is used as illustrated in FIG. 1 has been described, the present invention is not limited to this and may employ a configuration in which a roller conveyor is used and an X-ray is made to pass through a space between rollers.

The system for non-destructively inspecting baggage, the method for non-destructively inspecting baggage, the program, and the recording medium according to the present invention can be industrially manufactured and can be targets of commercial transactions, and therefore, the present invention has an economic value and is industrially applicable.

The invention claimed is:

1. A system for non-destructively inspecting baggage comprising:
   conveyance means for conveying a piece of baggage;
   irradiation means for irradiating the piece of baggage with an X-ray;
   imaging means for imaging the X-ray that passes through the piece of baggage;
   analysis means for analyzing image information from the imaging means;
   display means for displaying an image analyzed by the analysis means; and
   control means for controlling said display means to display at least a portion of the detection target on the display means as an object, when a subject and another subject overlap in the piece of baggage, the subject is a detection target to be detected in an X-ray inspection, and at least the portion of the detection target is analyzed, wherein the control means includes a similarity estimation unit that inputs the image information to a learning model and obtains a score indicating a degree of similarity from the learning model, said at least a portion of the detection target being one of a knife-point, a knife-blade, or a knife-heel of the knife, and wherein the control means performs control to display at least the one of a knife-point, a knife-blade, or a knife-heel of the knife when the obtained score satisfies a predetermined condition, the learning model being a model subjected to machine learning for estimating a degree of similarity of an image of the knife in the piece of baggage with at least the one of a knife-point, a knife-blade, or a knife-heel,
   wherein the control means performs for an image data of the object, at least one of changing of an aspect ratio, changing of an angle of rotation, enlarging, reducing, or horizontal flipping.

2. The system for non-destructively inspecting baggage according to claim 1, wherein the detection target is a knife.

3. The system for non-destructively inspecting baggage according to claim 1, wherein the detection target is identified on the basis of a plurality of characteristic aspects.

4. The system for non-destructively inspecting baggage according to claim 1, wherein said imaging means uses CT, dual energy, dual energy CT, or photon counting.

5. The system for non-destructively inspecting baggage according to claim 1, wherein the similarity estimation unit includes division means for dividing the image into a plurality of borders, areas, or grid cells, position calculation means for calculating a position of each of the grid cells, and reliability level calculation means for calculating a reliability level of each of the grid cells.

6. The system for non-destructively inspecting baggage according to claim 1, wherein the control means further performs color changing for an image data of the object.

7. A method for non-destructively inspecting baggage comprising:
   a first step of conveying a piece of baggage;
   a second step of irradiating the piece of baggage with an X-ray;
   a third step of imaging the X-ray that passes through the piece of baggage;
   a fourth step of analyzing image information from the third step;
   a fifth step of displaying an image analyzed in the fourth step; and
   a sixth step of performing control of said displaying of the image to display at least one of the knife-point, the knife-blade, or the knife-heel of the knife as an object in the fifth step when a subject and another subject overlap in the piece of baggage, and when the subject is a knife, and when at least one of a knife-point, a knife-blade, or a knife-heel of the knife is analyzed in the fourth step,
   wherein the sixth step includes estimating a similarity by inputting the image information to a learning model and obtaining a score indicating a degree of similarity from the learning model of said subject being one of a knife-point, a knife-blade, or a knife-heel of the knife, and wherein the sixth step of performing control includes displaying at least one of the knife-point, the knife-blade, or the knife-heel of the knife when the obtained score satisfies a predetermined condition, the learning model being a model subjected to machine learning for estimating a degree of similarity of an image of the knife in the piece of baggage with at least one of the knife-point, the knife-blade, or the knife-heel,
   wherein the sixth step of controlling for the image of the object includes at least one of changing of an aspect ratio of the image, changing of an angle of rotation of the image, enlarging the image, reducing the image, or horizontal flipping of the image.

8. A non-transitory recording medium recording a program for a system for non-destructively inspecting baggage in which a piece of baggage conveyed by conveyance means is irradiated with an X-ray, the X-ray that passes through the piece of baggage is imaged by imaging means, image information from the imaging means is analyzed by analysis means, and an image analyzed by the analysis means is displayed on display means,
   the program causing a computer to execute:
   a first function of analyzing at least a portion of a detection target that is a subject to be detected in an X-ray inspection and that overlaps with another subject in the piece of baggage; and
   a second function of performing control to display at least the portion of the detection target on the display means as an object,
   wherein the first function includes inputting the image information to a learning model and obtains a score indicating a degree of similarity from the learning model, said at least a portion of the detection target being one of a knife-point, a knife-blade, or a knife-heel of the knife, and wherein the second function includes displaying at least one of the knife-point, the knife-blade, or the knife-heel of the knife when the obtained score satisfies a predetermined condition, the learning model being a model subjected to machine learning for estimating a degree of similarity of an image of the knife in the piece of baggage with at least one of the knife-point, the knife-blade, or the knife-heel,
   wherein the second function includes at least one of changing of an aspect ratio, changing of an angle of rotation, enlarging, reducing, or horizontal flipping.

* * * * *